US 7,586,951 B2

(12) United States Patent
Frodsham et al.

(10) Patent No.: US 7,586,951 B2
(45) Date of Patent: Sep. 8, 2009

(54) METHOD, APPARATUS, AND SYSTEM FOR IDLE STATE DEFINITION FOR POWER MANAGEMENT

(75) Inventors: Tim Frodsham, Portland, OR (US); Naveen Cherukuri, San Jose, CA (US); Sanjay Darbal, Palo Alto, CA (US); David S. Dunning, Portland, OR (US); Theodore Z. Schoenborn, Portland, OR (US); Lakshminarayan Krishnamurty, Hillsboro, OR (US); Aaron T. Spink, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 711 days.

(21) Appl. No.: 10/833,964

(22) Filed: Apr. 27, 2004

(65) Prior Publication Data
US 2005/0238055 A1 Oct. 27, 2005

(51) Int. Cl.
H04J 3/24 (2006.01)
H04J 3/14 (2006.01)
G06F 13/00 (2006.01)
H04L 27/00 (2006.01)

(52) U.S. Cl. .................. 370/474; 370/328; 370/392; 370/436; 370/500; 713/300; 375/295; 375/222

(58) Field of Classification Search ............... 370/528, 370/469, 389, 436, 328, 474, 392, 500; 713/300; 375/295, 222, 219
See application file for complete search history.

(56) References Cited
U.S. PATENT DOCUMENTS 5,371,734 A * 12/1994 Fischer ..................... 370/311

| | | | | |
|---|---|---|---|---|
| 5,754,436 A * | 5/1998 | Walsh et al. | ............... | 713/300 |
| 5,778,419 A * | 7/1998 | Hansen et al. | ............... | 711/112 |
| 6,009,488 A | 12/1999 | Kavipurapu | | |
| 6,065,077 A * | 5/2000 | Fu | ............... | 710/100 |
| 6,108,322 A * | 8/2000 | Kotzin et al. | ............... | 370/333 |
| 6,246,725 B1 * | 6/2001 | Vanzieleghem et al. | ..... | 375/295 |
| 6,457,081 B1 * | 9/2002 | Gulick | ............... | 710/305 |
| 6,457,087 B1 * | 9/2002 | Fu | ............... | 710/305 |
| 6,498,936 B1 * | 12/2002 | Raith | ............... | 455/466 |
| 6,516,442 B1 * | 2/2003 | Wang et al. | ............... | 714/776 |
| 6,795,450 B1 * | 9/2004 | Mills et al. | ............... | 370/463 |
| 7,007,103 B2 * | 2/2006 | Pinkerton et al. | ............... | 709/238 |
| 7,031,258 B1 * | 4/2006 | Frisch et al. | ............... | 370/235 |
| 7,035,294 B2 * | 4/2006 | Dove et al. | ............... | 370/535 |
| 7,095,798 B2 * | 8/2006 | Hunton | ............... | 375/296 |
| 7,117,292 B2 * | 10/2006 | Kelly | ............... | 711/5 |
| 7,131,020 B2 * | 10/2006 | Moll et al. | ............... | 713/375 |
| 7,170,952 B2 * | 1/2007 | Hunton | ............... | 375/296 |
| 7,254,159 B1 * | 8/2007 | Lavelle et al. | ............... | 375/141 |
| 2003/0206564 A1 * | 11/2003 | Mills et al. | ............... | 370/528 |
| 2004/0153676 A1 * | 8/2004 | Krantz et al. | ............... | 713/300 |

OTHER PUBLICATIONS

Tutorials for The Complete PCI Express Reference book from Intel press, Intel Corporation, 2002, 2003.

* cited by examiner

*Primary Examiner*—Ayaz R Sheikh
*Assistant Examiner*—Venkatesh Haliyur
(74) *Attorney, Agent, or Firm*—Trop, Pruner & Hu, P.C.

(57) ABSTRACT

A predetermined network packet is utilized for power reduction in either or both of a transmitter and receiver when information is not needed. Upon detection of the predetermined network packet type, various portions of the transmitter and/or receiver may be clock gated or powered down.

13 Claims, 4 Drawing Sheets

For embodiment of 22 lanes with 2 bits for CRC: 0000 1101 1111 1000 0111 1011 (L21:L0, C1:C0)

For embodiment of 18 lanes with 2 bits for CRC: *1101 1111 1000 0111 1011 (L17:L0,C1:C0)*.

Figure 2

METHOD, APPARATUS, AND SYSTEM FOR IDLE STATE DEFINITION FOR POWER MANAGEMENT

BACKGROUND

1. Field

This disclosure generally relates to power management with an idle state definition.

2. Background Information

The demand for more powerful computers and communication products has resulted in faster processors and busses that often have higher die temperatures and consume increasing amounts of power. Consequently, design engineers struggle with reducing power consumption and die temperature.

For example, serial busses that utilize serial links, such as, PCI-Express and other link based interconnection systems, utilize an interface that is always transmitting and receiving data. Therefore, one disadvantage of high speed serial links is increased power consumption. Specifically, the physical layer transmitter and receiver can consume a constant DC current, regardless whether the interface is actually transmitting or receiving data.

Various attempts for power management schemes for addressing the increased power consumption for serial links and serial busses have been proposed and implemented. However, they require time to put the serial link to sleep and time to wake the link up again. Consequently, the latency required for transitioning between power management states adversely impacts performance in a microprocessor environment.

BRIEF DESCRIPTION OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference to the following detailed description when read with the accompanying drawings in which:

FIG. 2 is a multiple embodiments of an idle state for a first word of a packet as utilized in accordance with the claimed subject matter.

DETAILED DESCRIPTION

In the following detailed description, numerous specific details are set forth in order to provide a thorough understanding of the claimed subject matter. However, it will be understood by those skilled in the art that the claimed subject matter may be practiced without these specific details. In other instances, well-known methods, procedures, components and circuits have not been described in detail so as not to obscure the claimed subject matter.

An area of current technological development relates to achieving longer battery life for communication products and computer or computing systems by reducing power consumption. Presently, serial busses that utilize serial links, such as, PCI-Express and other link based interconnection systems, utilize an interface that is always transmitting and receiving data. Therefore, one disadvantage of high speed serial links is increased power consumption. However, they require time to put the serial link to sleep and time to wake the link up again. Consequently, the latency required for transitioning between power management states adversely impacts performance in a microprocessor environment.

In contrast, the claimed subject matter facilitates reduced power consumption by a physical interface layer transmitting and/or receiving a predetermined network packet when another layer does not need the physical interface layer for transmitting or receiving data. In one embodiment, the predetermined network packet is designated as an "idle packet", wherein the data is constant for a respective lane. Upon transmitting or receiving the idle packets, the predetermined network pack is detected. Consequently, various circuit portions of the physical interface's transmitter and/or receiver may be clock gated or powered down. Therefore, the transmitter and/or receiver utilize less power relative to the condition when the transmitter and receiver are receiving normal network packets with data for other protocol layers.

In one embodiment, the predetermined network packet is generated based at least in part on conforming to a predetermined ECC (Error Correcting Code). In another embodiment, the predetermined network packet is generated based at least in part on conforming to predetermined ECC (Error Correcting Code) and Code Recovery Codes (CRC). In both previous embodiments, any known ECC and CRC may be used. In yet another embodiment, the predetermined network packet is generated based at least in part maintaining constant data in each lane regardless of ECC and CRC.

In one embodiment, the network packet comprises a plurality of lanes. The network packet contains control, data, and may also include clock information. In this embodiment, the lane is a single bit wide (serial) conduit of control/data or clock information. For example, this lane is physically represented by a differential pair of copper conductors.

Figure 1:
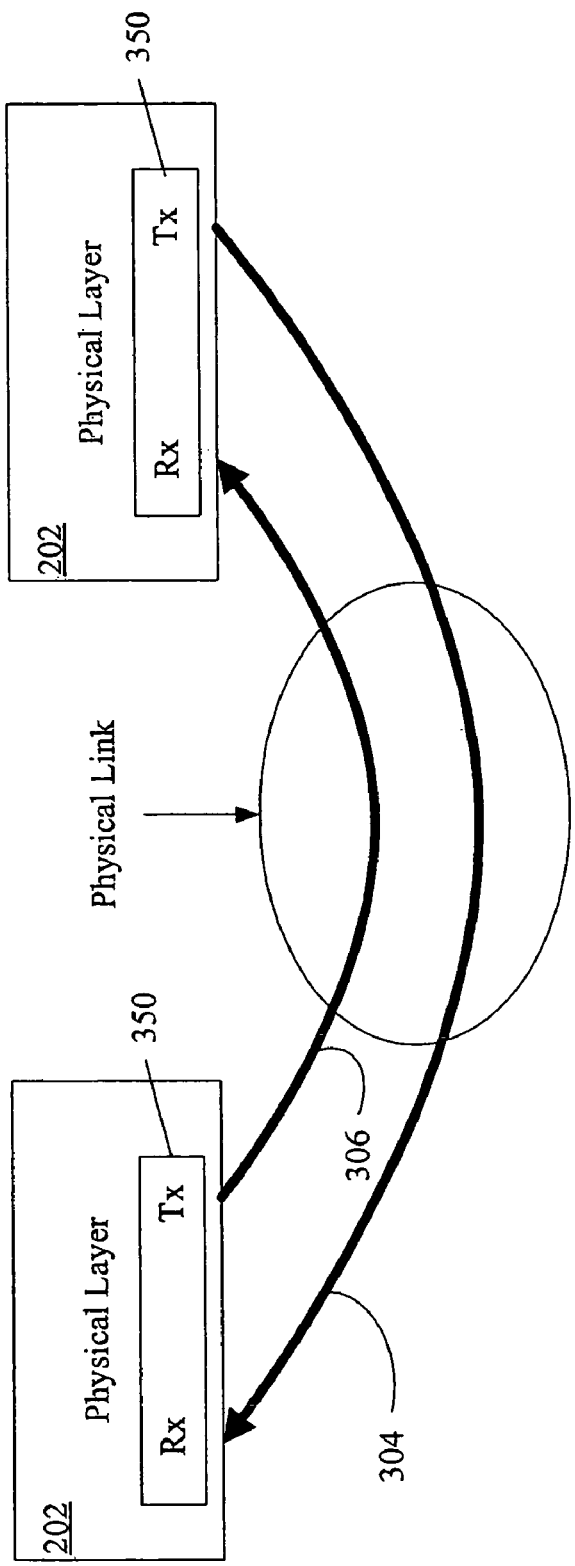
FIG. 1 is a block diagram of an apparatus for a physical interconnect utilized in accordance with the claimed subject matter.

FIG. 1 is a block diagram of an apparatus for a physical interconnect utilized in accordance with the claimed subject matter. In one aspect, the apparatus depicts a physical layer for a cache-coherent, link-based interconnect scheme for a processor, chipset, and/or IO bridge components. For example, the physical interconnect may be performed by each physical layer of an integrated device. Specifically, the physical layer provides communication between two ports over a physical interconnect comprising two uni-directional links. Specifically, one uni-directional link 304 from a first transmit port 350 of a first integrated device to a first receiver port 350 of a second integrated device. Likewise, a second uni-directional link 306 from a first transmit port 350 of the second integrated device to a first receiver port 350 of the first integrated device. However, the claimed subject matter is not limited to two uni-directional links. One skilled in the art appreciates the claimed subject matter supports any know signaling techniques, such as, bi-directional links, etc.

As previously described, the claimed subject matter facilitates reduced power consumption by a physical interface layer transmitting and/or receiving a predetermined network packet when another layer does not need the physical interface layer for transmitting or receiving data. In one embodiment, the cache-coherent, link-based interconnect scheme utilizes a plurality of layers, such as, protocol layer, transport layer, routing layer, link layer, and physical layer. In this embodiment, the physical layer 202 is considered the "lowest" layer since it involves actually transmitting and/or receiving data and is directly interacts with the Link Layer. Thus, it isolates the other layers from electrical and physical implementation details.

In another embodiment, the cache-coherent, link-based interconnect scheme utilizes a plurality of layers, such as, protocol layer, link layer, and physical layer. For example, the functionality of a layer may be incorporated within another layer for certain platforms, such as, desktop/mobile and dual processor systems. Specifically, the functionality of the routing layer may be embedded in a link layer. Hence, the routing layer is not needed for such systems.

FIG. 2 is a packet utilized in accordance with the claimed subject matter. As previously described, the physical interface layer transmits and/or receives a predetermined network packet when another layer does not need the physical interface layer for transmitting or receiving data. In one embodiment, the predetermined network packet is designated as an "idle packet", wherein the data is constant for a respective lane. For example, this proposed packet is one example of an idle packet that may be used by the physical interface layer to transmits and/or receives when another layer does not need the physical interface layer for transmitting or receiving data. Upon transmitting or receiving the idle packets, various circuit portions of the physical interface's transmitter and/or receiver may be clock gated or power down, which is discussed further in connection with FIG. 3.

In this embodiment, the proposed idle packet meets Cyclic Redundancy Code (CRC) requirements of the cache-coherent, link-based interconnect scheme. The first example of a packet depicts 22 lanes with two additional lanes for CRC. In this embodiment, the first row is the header of the packet and may be repeated for the remaining words in the packet. In this embodiment, the packet contains four words and the binary signature is repeated for each row so as to maintain constant binary values for each respective lane. In another embodiment, a packet depicts 18 lanes with two additional lanes for CRC. For both previous embodiments, the idle packet conforms to a CRC and the CRC was generated based on the following polynomial:

$$0x185, \text{ i.e., } x^8+x^7+x^2+1.$$

As previously described, a predetermined network packet is generated based either on ECC, CRC, or neither, to arrive at a particular signature of data with each lane maintaining the same binary value. During normal operation, a network packet is detected a being an "idle packet" by analyzing the first row, designated as a header, to determine whether it is similar to a header of an idle packet. Consequently, various circuit portions of the physical interface's transmitter and/or receiver may be clock gated or power down, which is discussed further in connection with FIG. 3.

However, the claimed subject matter is not limited to the present example depicted in FIG. 2. For example, in one embodiment, the predetermined network packet is generated based at least in part on conforming to a predetermined ECC (Error Correcting Code). In another embodiment, the predetermined network packet is generated based at least in part on conforming to predetermined ECC (Error Correcting Code) and Code Recovery Codes (CRC). In both previous embodiments, any known ECC and CRC may be used. In yet another embodiment, the predetermined network packet is generated based at least in part maintaining constant data in each lane regardless of ECC and CRC.

In one embodiment, the network packet comprises a plurality of lanes. The network packet contains control, data, and may also include clock information. In this embodiment, the lane is a single bit wide (serial) conduit of control/data or clock information. For example, this lane is physically represented by a differential pair of copper conductors. One skilled in the art appreciates utilizing network packets of different lane sizes and with different combinations of clock information. In another embodiment, a network packet comprises 20 lanes with 1 lane for clock information. For example, in one embodiment for a 20 bit wide link utilizes 42 lanes: 20 lanes for carrying control/data and 1 lane carrying the forwarded clock in one direction and 20 lanes for carrying control/data and 1 lane carrying the forwarded clock in the other direction.

Figure 3:
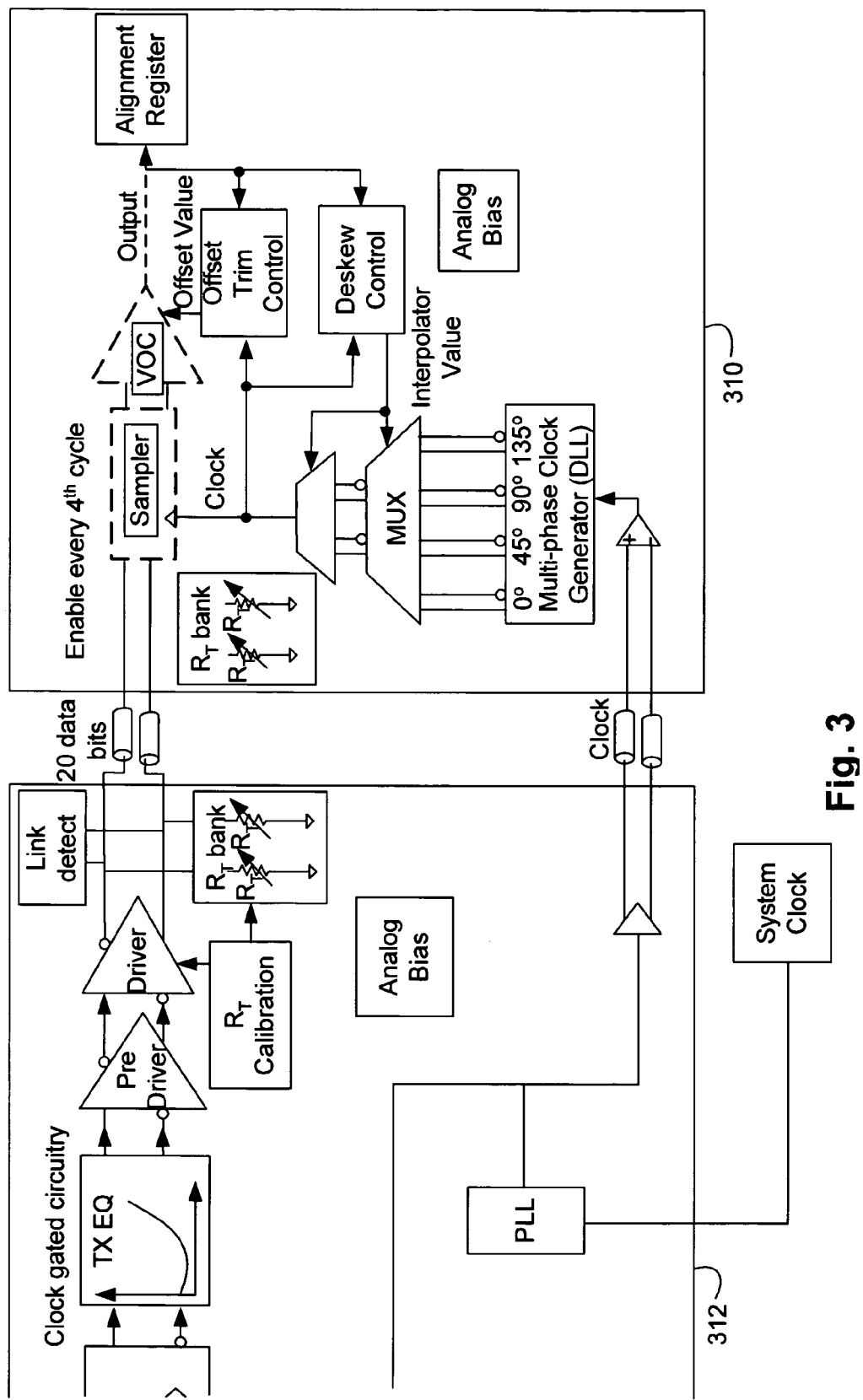
FIG. 3 is a block diagram of an apparatus for an interface for the physical interconnect as utilized in accordance with the claimed subject matter.

FIG. 3 is a block diagram of an apparatus for an interface for the physical interconnect as utilized in accordance with the claimed subject matter. The block diagram depicts a receiver 310 and a transmitter 312. In one embodiment, the transmitter sends 20 data bits over a link to the receiver.

The receiver comprises a sampler, interpolator, a variable offset comparator (VOC), trim and deskew control, a multiplexer coupled to the DLL and interpolator. As previously described, the transmitter would forward a predetermined network packet (idle packet) to the receiver in the event that actual data/control information is not needed. For example, the idle packet may be sent when a particular communication layer, such as, a physical layer is not needed to send or receive actual data that is needed by an integrated device or system. Upon transmitting the idle packet, the transmitter data path circuitry may be powered down or clock gated, such as, the TX EQ and predriver circuitry. The receiver analyzes at least one row (header) of the network packet and if the particular header matches a predetermined signature of the idle packet, various portions of the receiver may be clock gated or power down. In this embodiment, the sampler, VOC, alignment register, and interpolator, are clock gated or power down for a duration of at least this particular network packet. Subsequently, if another idle packet is detected, the receiver portions may remain powered down. Eventually, when a network packet that does not match the predetermined idle packet is received, the various portions of the receiver circuit that are needed for this network packet may be powered on or disabling of the clock gating.

The claimed subject matter is not limited to powering down or clock gating the previously described portions of the receiver and transmitter. One skilled in the art appreciates powering down or clock gating different portions of the receiver and transmitter based at least in part on their particular design, communication protocol, etc.

Figure 4:
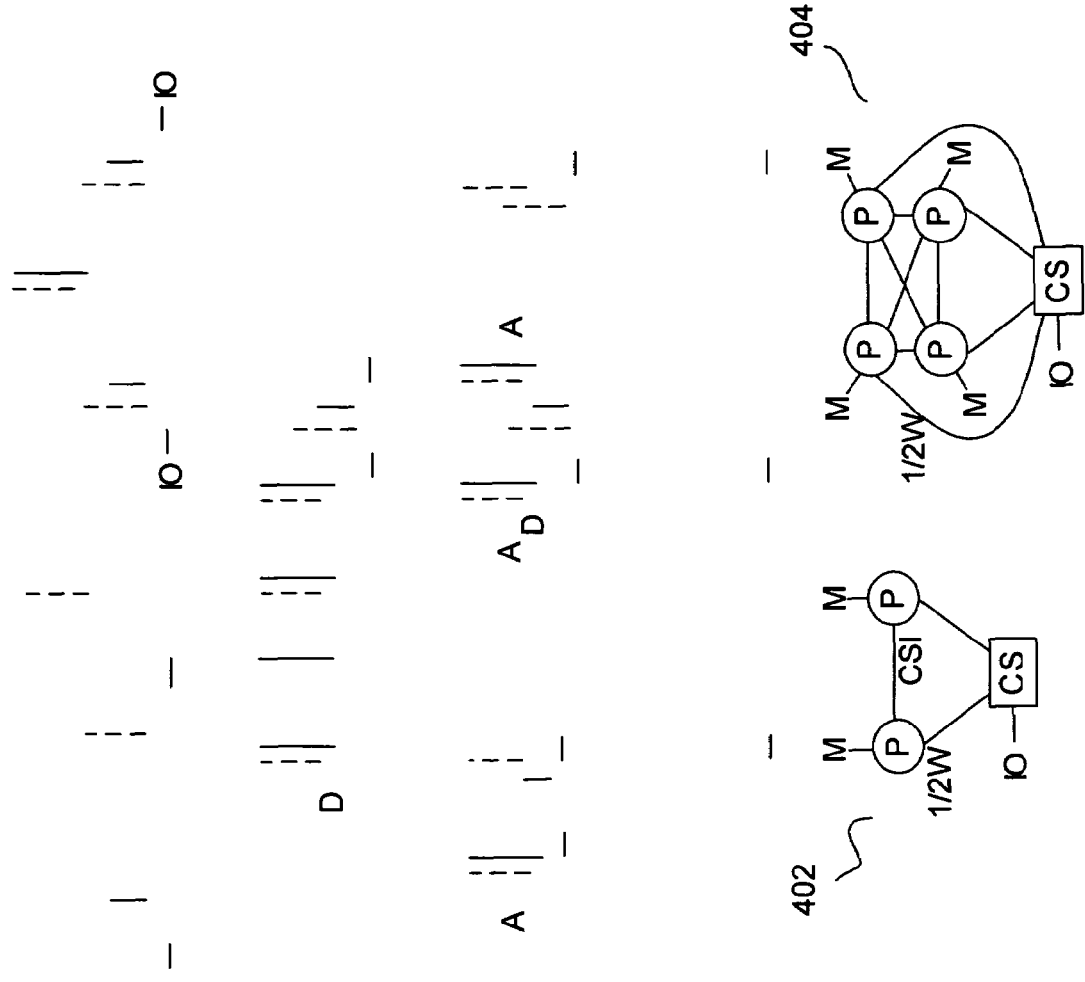
FIG. 4 is a variety of system diagrams as utilized by a plurality of embodiments.
Figure 4:
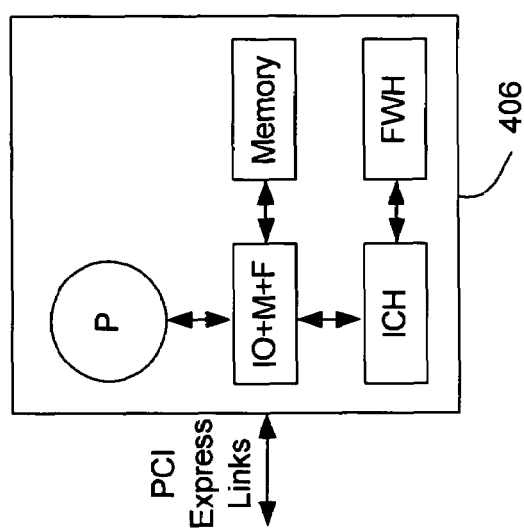

FIG. 4 depicts a point to point system with one or more processors. The claimed subject matter comprises several embodiments, one with one processor 406, one with two processors (P) 402 and one with four processors (P) 404. In embodiments 402 and 404, each processor is coupled to a memory (M) and is connected to each processor via a network fabric may comprise either or all of: a link layer, a protocol layer, a routing layer, a transport layer, and a physical layer. The fabric facilitates transporting messages from one protocol (home or caching agent) to another protocol for a point to point network. As previously described, the system of a network fabric supports any of the embodiments depicted in connection with embodiments depicted in FIGS. 1-3.

For embodiment 406, the uni-processor P is coupled to graphics and memory control, depicted as IO+M+F, via a network fabric link that corresponds to a layered protocol scheme. The graphics and memory control is coupled to memory and is capable of receiving and transmitting via PCI Express Links. Likewise, the graphics and memory control is coupled to the ICH. Furthermore, the ICH is coupled to a firmware hub (FWH) via a LPC bus. Also, for a different uni-processor embodiment, the processor would have external network fabric links. The processor may have multiple cores with split or shared caches with each core coupled to a Xbar router and a non-routing global links interface. Thus, the external network fabric links are coupled to the Xbar router and a non-routing global links interface.

Although the claimed subject matter has been described with reference to specific embodiments, this description is not meant to be construed in a limiting sense. Various modifications of the disclosed embodiment, as well as alternative embodiments of the claimed subject matter, will become apparent to persons skilled in the art upon reference to the description of the claimed subject matter. It is contemplated, therefore, that such modifications can be made without departing from the spirit or scope of the claimed subject matter as defined in the appended claims.

The invention claimed is:

1. A method for generating an idle packet comprising:
generating the idle packet formed of a plurality of words each formed of a plurality of bits, based at least in part on the idle packet having the same binary bit value in each of the plurality of words and conforming to a predetermined error correction code for each respective lane of a plurality of lanes of a link coupled between a first integrated device and a second integrated device, wherein the link is of a cache-coherent, link-based interconnect scheme;
transmitting the idle packet from a physical layer of a transmitter of the first integrated device along the link;
receiving the idle packet in a physical layer of a receiver of the second integrated device;
identifying the idle packet with a first row of the plurality of words designated as a header; and
powering down or clock gating a predetermined portion of the transmitter for at least the duration of the idle packet responsive to identifying the idle packet, wherein the predetermined portion of the transmitter includes a transmitter equalizer (TX EQ) and a predriver circuitry.

2. The method of claim 1 wherein the plurality of words is four.

3. A method for generating an idle packet comprising:
generating the idle packet with a plurality of words each corresponding to a row based at least in part on a repeated binary signature in each row so as to maintain constant binary values for each respective lane of a plurality of lanes of a link and adhering to an Error Correction Code;
identifying the idle packet with a first row of the plurality of words designated as a header; and
powering down or clock gating a predetermined portion of a transmitter for at least the duration of the idle packet responsive to identifying the idle packet, wherein the predetermined portion of the transmitter includes a transmitter equalizer (TX EQ) and a predriver circuitry.

4. The method of claim 3 wherein the plurality of words is four.

5. A method for generating an idle packet comprising:
generating the idle packet in a physical layer of a transmitter when another layer coupled to the physical layer does not need the physical layer for transmitting or receiving data, the idle packet with a plurality of words each corresponding to a row based at least in part on a repeated binary signature in each row so as to maintain constant binary values for each respective lane of a plurality of lanes and adhering to a cyclic redundancy code (CRC);
transmitting the idle packet from the physical layer along the plurality of lanes;
receiving the idle packet in a physical layer of a receiver of the second integrated device;
identifying the idle packet with a first row of the plurality of words designated as a header; and
powering down or clock gating a predetermined portion of the transmitter for at least the duration of the idle packet responsive to identifying the idle packet, wherein the predetermined portion of the transmitter includes a transmitter equalizer (TX EQ) and a predriver circuitry.

6. The method of claim 5 wherein the plurality of words is four.

7. A method for reducing power consumption in a transmitter comprising:
forwarding an idle network packet formed of a binary signature repeated for each row of a plurality of rows to maintain constant binary values for each lane of a plurality of lanes of an interconnect, from a physical layer of the transmitter to a physical layer of the receiver when another layer coupled to the physical layer of the transmitter does not need the physical layer for transmitting or receiving data; and
powering down or clock gating a predetermined portion of the transmitter for at least the duration of the idle network packet, wherein the predetermined portion of the transmitter is transmitter data path circuitry, and wherein the transmitter data path circuitry is a transmitter equalizer (TX EQ) and a predriver circuitry.

8. A system for a network fabric comprising:
a plurality of serial links to either receive or transmit data between a first agent and a second agent;
a transmitter within the first agent to transmit an idle packet formed of a binary signature repeated for each row of a plurality of rows to maintain constant binary values for each lane of a plurality of lanes of an interconnect, based on a cyclic redundancy code (CRC) requirement of a cache-coherent link based interconnect scheme, when the system does not need to utilize a physical layer for actual data and to either power down or clock gate a predetermined portion of the transmitter; and
a receiver within the second agent to receive the idle packet and to either power down or clock gate a predetermined portion of the receiver responsive to receipt and identification of the idle packet.

9. The system of claim 8 wherein the predetermined portion of the receiver is a sampler, a variable offset comparator (VOC), an alignment register, and an interpolator.

10. The system of claim 8 wherein the predetermined portion of the transmitter is transmitter data path circuitry.

11. The method of claim 1, further comprising generating the idle packet based on a predetermined polynomial.

12. The method of claim 5, further comprising generating the CRC according to a predetermined polynomial.

13. The method of claim 5, wherein a first set of the plurality of lanes are for data of the idle packet and a second set of the plurality of lanes are for the CRC.

* * * * *

UNITED STATES PATENT AND TRADEMARK OFFICE
CERTIFICATE OF CORRECTION

PATENT NO.       : 7,586,951 B2
APPLICATION NO.  : 10/833964
DATED            : September 8, 2009
INVENTOR(S)      : Frodsham et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1270 days.

Signed and Sealed this

Twenty-first Day of September, 2010

David J. Kappos
*Director of the United States Patent and Trademark Office*